UNITED STATES PATENT OFFICE.

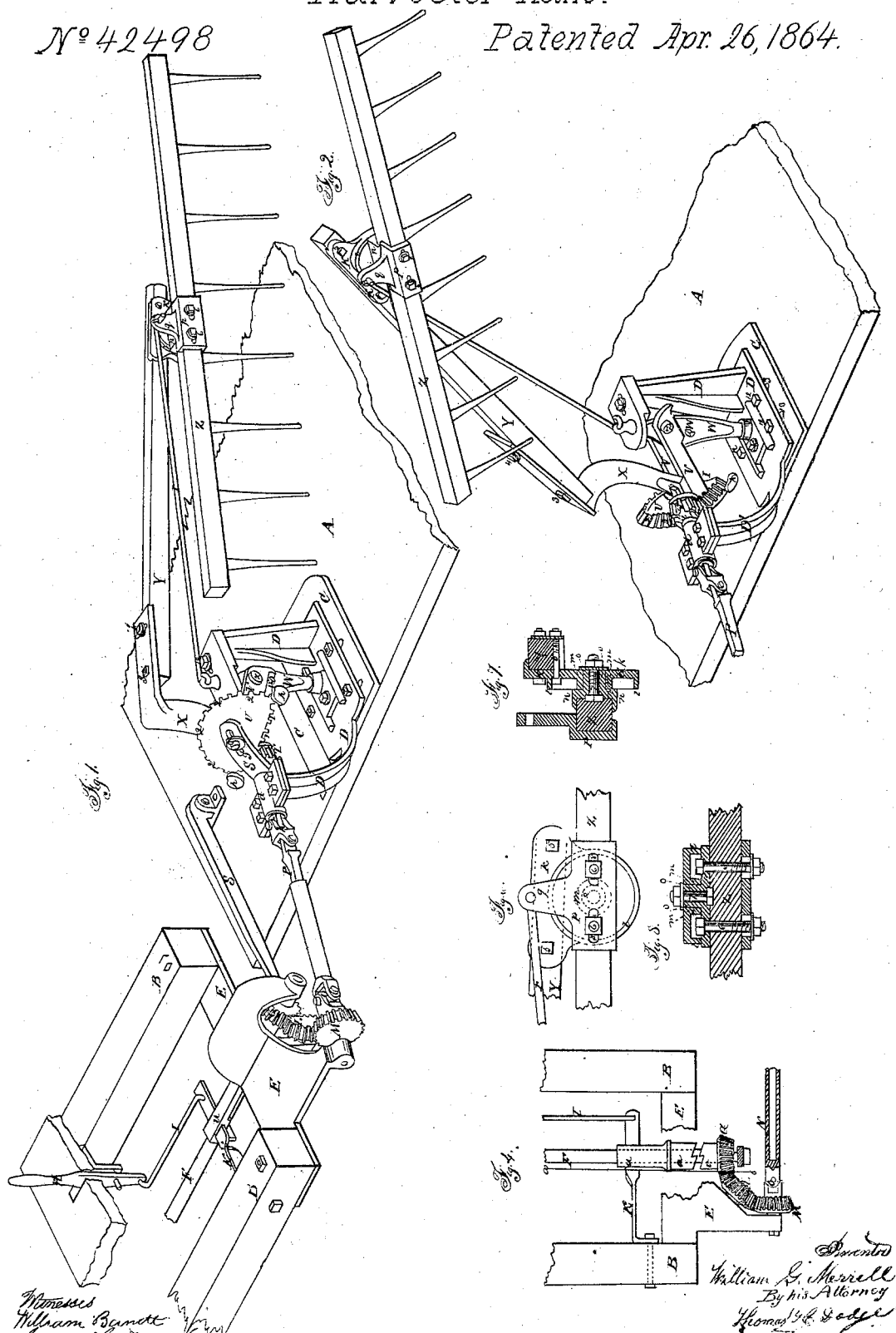

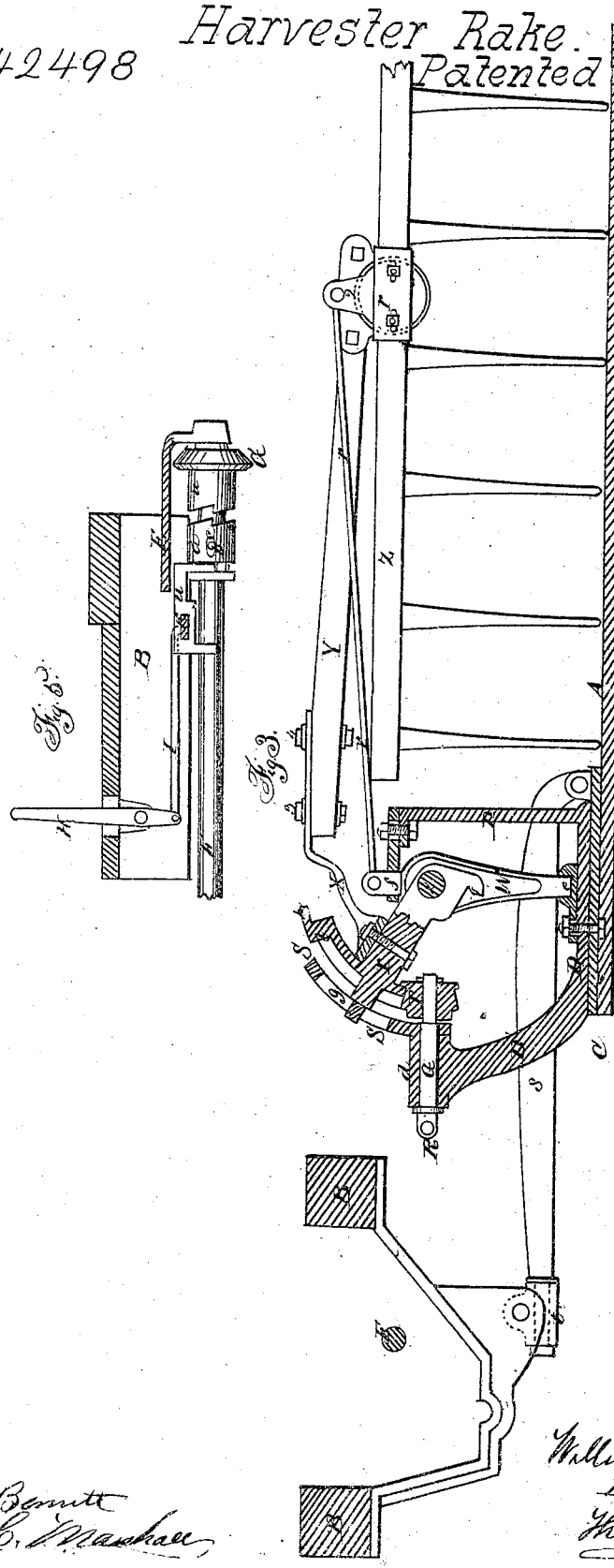

WILLIAM G. MERRELL, OF AUBURN, NEW YORK.

IMPROVEMENT IN RAKING ATTACHMENTS TO HARVESTERS.

Specification forming part of Letters Patent No. 42,498, dated April 26, 1864.

*To all whom it may concern:*

Be it known that I, WILLIAM G. MERRELL, of the city of Auburn, in the county of Cayuga and State of New York, have invented certain new and useful Improvements in Raking Attachments to Harvesters; and I do hereby declare that the following is a full, clear, and exact description of the construction and operation of the same, reference being had to the accompanying drawings, in which—

Figure 1 represents a perspective view of the raking attachments, showing the position when the rake is down on the platform to rake off the grain, showing, also, sections of the platform and of the main frame of the machine. Fig. 2 represents a perspective view of the raking attachment while the rake is in an elevated position to clear the platform. Fig. 3 represents an end view of the harvester-frame and raking attachment. Fig. 4 represents a top view of part of the main frame and the shaft and gearing which operate the rake. Fig. 5 represents a longitudinal vertical section through line $a\ b$ of Fig. 4. Figs. 6, 7, and 8 represent detached views of the connection of the rake-head with the rake-arm.

My invention relates to the construction, combination, and arrangement of the several parts and gearing of the raking apparatus by which the rake performs the accurate movements necessary to a perfect operation of a rake, and which movements are not interfered with by the continuously-changing relative position of the harvester-platform toward the main frame while the machine passes over uneven ground.

It also relates to the peculiar method of pivoting the rake-head to the rake-arm, by which its movements can be controlled in such a manner that it shall descend vertically on the platform and on the grain thereon, and that it shall rise vertically after having delivered the grain, thus delivering perfect sheaves in which the straw is not tangled by any side motion of the rake.

To enable others skilled in the art to make and use my invention, I will proceed to describe its construction and operation.

A represents part of the platform of the harvester.

B represents the rear portion of the harvester-frame.

C represents a plate, which is secured to the platform A near its inner and front edge, and to which the frame D is secured, which supports the bearings of the rake-arm and its gearing.

E represents a plate, which is secured to the lower side of the main frame B, and which supports the driving-shaft F and its gearing.

The bevel-wheel G is set loosely upon the shaft F, but may be coupled therewith by means of the sliding coupling $a$, which is connected with the shaft F by means of the pin $b$, which passes through the slot $c$ of the coupling $a$. The latter is operated by means of the lever H, rod I, and spring K, which tends to uncouple the gearing. The bevel-wheel G meshes with the intermediate gearing, L, and the latter with the gear M to give the rake the movement in the proper direction. The bevel-wheel M is connected with the hollow shaft N by means of a universal joint, O, the hollow of the shaft N being square, in which the square shank P fits loosely, so as to revolve with said shaft, but to have free play to slide in the cavity. The shank P is connected with the journal Q, Fig. 3, by means of the universal joint R, the journal Q being of such a length as to have a firm bearing in its box $d$, which is supported by the bracket D' of the frame D.

S represents a curved slotted crank-arm, which is secured to the journal Q; and T represents a bevel-pinion, which is secured to the end of said journal.

U represents a cam-gear, which is operated by the pinion T. Its shape is represented in Fig. 1. Its gearing is constructed in two arcs of circles lying in two different planes. The arc of the gearing 1, which is represented in a horizontal plane in Fig. 1, when operated upon causes the rake to make a circular horizontal sweep, as is necessary to rake the grain from the platform. The arc of the gearing 2, which lies in an inclined plane, causes the rake to rise after the grain is raked off, to sweep round in its elevated position and to descend on the platform.

V represents the shaft of the cam-gear U. It is pivoted at $z$ to the vertical center shaft, W, which turns in its bearings $e\ f$. The cam-gear U in its operation has a compound motion. When the pinion T acts on the horizontal gearing 1, as represented in Figs. 1 and 3, the cam-gear U revolves around the center shaft, W; but when the pinion T acts upon the gearing 2 the wheel U turns not only on the shaft W, but also on the pin $z$, and the slotted arm S carries the wheel U around the pinion T, and the end of the shaft V of the wheel U plays in the slot $g$ of said arm S to allow for the eccentricity of the gearing. To insure a perfect operation of these eccentric wheels while passing the sharp angles where the gearings 1 and 2 meet, I have provided the wheel U with guiding-lugs $h$, which at the certain point mesh into proper recesses $i$ in the body of the pinion T, as represented in Fig. 2. These lugs carry the wheel over what I call the "dead points" at the two corners of the wheel and insure a perfect contact and operation.

X represents the rake-arm supporter. It is secured to the shaft V of the wheel U by the bolt 9, as represented in Figs. 2 and 3, and participates in the compound motions of said shaft.

Y represents the rake-arm. It is secured to the supporter X by means of the bolts 3 4, the latter of which passes through a slot in the rake-supporter X, so that its position may be accurately adjusted.

Z represents the rake-head. It is attached to the end of the rake-arm by a pivot arrangement of the following construction: The plate $k$ is secured to the rake-arm Y by means of the bolts 5. It has a raised rim, $l$, and a hub, $m$, in its center, through which the hollow pivot $o$ of the plate $n$ passes. The plate $n$ is secured by means of the bolts 6 to the rake-head, and the bolts 7 secure the pivot $o$ within the hub $m$. The rake-head can therefore turn freely on the center pivot, $o$; but the rim $l$ supports it in its movement and protects it against any side pressure.

$p$ represents a plate, which is also secured to the rake-head by means of the bolts 6. It has an extension, $q$, which is connected with the upper end of the shaft W by means of the rod $r$, and by this arrangement the rake-head is swung round on its center pivot in such a manner that it will descend vertically on the platform, remain there in a vertical position, and rise vertically from the grain; and these movements can be adjusted with the greatest accuracy by adjusting the plate $p$, which for this purpose has slots 8, through which the bolts 6 pass; also, by making the position of the center shaft, W, adjustable by means of the adjustable screw-bolts 10 and 11 of the frame D, which pass through slots in said frame. The plate C is also provided with slots 13, through which the bolts 12 of the frame D pass to make the latter adjustable thereon in a longitudinal direction.

The platform A is connected with the frame B of the machine by means of the hinged bar $s$, which is attached to the metal frame A' by the swivel-joint $l$. The platform and raking apparatus thereon can therefore be raised and lowered to conform to the irregularities of the ground, and the connection between the gearing of the raking apparatus and the gearing on the frame, consisting substantially in the universal joints $o$, hollow shaft N, and shank P, permit a free motion of said platform without interrupting the free motion of the gearing and rake.

The operation of the machine is as follows: Motion is imparted to the driving-shaft F from the gearing of the machine; but the spring $k$ presses the clutch $u$ and coupling $a$ forward, thereby keeping the two couplings $a$ and $v$ disconnected. When the rake is to operate the driver on the seat pulls the lever H forward, and thus connects the couplings $a\ v$, and the bevel-wheels G L M are operated, and in turn operate the gearing of the rake. The slotted crank-arm S is turned by the action of the shaft N and carries the cam-wheel U around the pinion T, and as the latter is also turned by the shaft N it turns the cam-wheel U on the center shaft, W. While the gearing 1 of the cam-wheel U is in contact with that of the pinion T the rake performs a circular sweep over the platform, raking off the grain; but as soon as the gearing 2 comes in contact with the pinion T the rake-arm Y rises, and the rake-head Z is so turned by the action of the rod $r$ that it shall rise from the grain in a perpendicular position. In still further rising the rake is sufficiently elevated to clear the falling grain, and in descending the rod $r$ again so turns the rake-head that it will reach the grain on the platform in a perpendicular position and the operation is repeated. The rake while sweeping over the platform is sustained in its horizontal position by the projection $w$ on shaft W, which keeps the shaft V in its position and prevents the rake from dragging on the platform.

The rake, as shown in the drawings, is particularly adapted for use on Ball's patented combined reaper and mower, in which the platform is drawn forward by a "drag-bar," so called, extending from the heel of the finger-beam forward to the front inner corner of the main frame, where it is swiveled to said frame, so that the grain-platform can rise and fall to conform to the inequalities of the ground independent of the up and down motions of the main frame.

Having thus fully described the nature of my invention, what I claim herein as new, and desire to secure by Letters Patent, is—

1. The combination of the slotted crank-arm S, bevel-pinion T, and cam-wheel U, substantially in the manner and for the purposes described.

2. Providing the cam-wheel U with the lugs $h$, in combination with the recess $i$ in pinion T for the purpose of carrying the cam-wheel over the dead-points, substantially in the manner and for the purposes described.

3. The combination of the cam-wheel U, pinion T, pivoted cam-wheel shaft V, center shaft, W, and rake-arm supporter X, substantially in the manner and for the purpose described.

4. Securing the rake-head Z to the rake-arm Y by means of pivot-joint plates $k$ and $n$, having circular bearings $l$ and $m$, and constructed and arranged substantially in the manner and for the purpose described.

5. The lug $w$ on shaft W, in combination with the lip on shaft V, substantially as and for the purposes set forth.

6. The combination of the adjustable frame D with the base-plate C, attached to the platform A in the manner shown and described, and for the purposes set forth.

WILLIAM G. MERRELL.

Witnesses:
JOHN J. STEVENSON,
HORACE T. COOK.